Oct. 8, 1946.                C. L. PAULUS ET AL                 2,408,808
    AUTOMATIC CLUTCH AND BRAKE FOR ELECTRIC MOTORS AND GENERATORS
                        Filed July 9, 1943
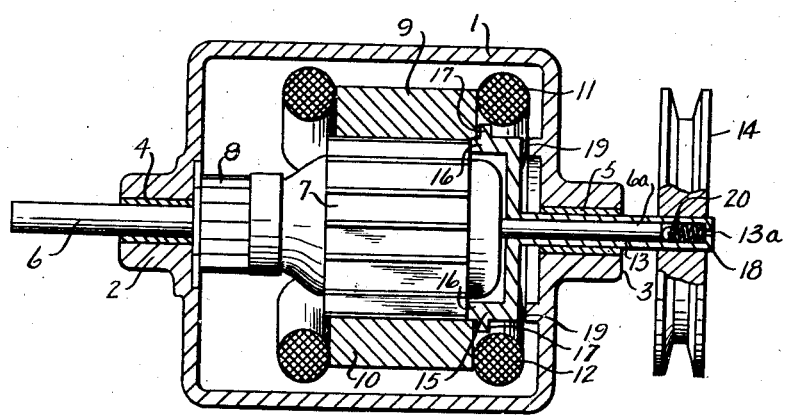
INVENTORS
CHARLES L. PAULUS
RAYMOND K. STOUT

Patented Oct. 8, 1946

2,408,808

UNITED STATES PATENT OFFICE 2,408,808

AUTOMATIC CLUTCH AND BRAKE FOR ELECTRIC MOTORS AND GENERATORS

Charles L. Paulus and Raymond K. Stout, Dayton, Ohio

Application July 9, 1943, Serial No. 494,028

1 Claim. (Cl. 172—36)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to automatic clutches and brakes for electric motors and generators, especially small servomotors. Objects of the invention are to provide a clutch and brake which is light in weight, which occupies no space additional to that taken up by the motor or generator, which consumes no power that is useful in operation of the motor, which is inexpensive to manufacture and will give good service for a long period. The preferred form of the invention employs a movable braking disk which also is the movable part of the clutch, said disk clutching the armature by magnetism derived from the stray lines of force of the motor field, and declutching and braking by spring pressure when the lines of force disappear. Thus the braking is instantaneous and the load driven by the motor stops immediately, which is a further advantage of the invention.

In the accompanying drawing, the single figure shows diagrammatically the preferred arrangement of a light motor with the automatic clutch and brake of the invention.

Referring particularly to the drawing, the motor housing 1 has integral bosses 2, 3 at opposite ends, and bushings 4, 5 inserted in the bosses and providing bearings for the motorshaft 6, one end of which is reduced for the purposes of this invention, as shown at 6a. The armature 7 and commutator 8 are also indicated. Field cores 9, 10 and field windings 11, 12 are fixed inside the housing by means not shown because well known in the art. Leads transmit current through brushes (not shown) to the commutator causing rotation of the armature as will be understood.

Slidable on the reduced shaft portion 6a is a sleeve 13 whose outer end may be closed except for a small port 13a providing for the escape of air entrapped between the shaft end 6a and the end of the sleeve. Sleeve 13 may drive the load by means of a pulley 14 or spur gear not shown. Secured to and preferably integral with the sleeve is a clutch member 15 in the form of a light weight flanged disk of magnetic material such as soft iron, having an annular flange 16 whose edge is adapted to engage the end of the armature and having an annular rib 17 at right angles to flange 16. This rib has a clearance of about .005 in. relative to the field core and overlaps the latter so as to intercept stray lines of force outside of the field. These lines of force will magnetize the clutch member and pull it against the armature so that the clutch member is magnetically locked to the armature but is free to move away when the lines of force disappear, as when the current to the motor is cut off. To move the clutch member away from the armature automatically, a compression spring 18 is housed by the sleeve 13 to bear against the end of shaft 6a and the closed end of the sleeve. Thus in its normal position (when the motor is stationary) the clutch member is withdrawn as far as possible from the armature and is pressed against the edge of annular flange 19 integral with the housing 1. This pressure creates friction which quickly stops any load driven by sleeve 13. Greater friction, hence quicker stoppage, may be had by facing flange 19 with a band of high friction brake material (not shown). A ball bearing 20 may be interposed between the end of compression spring 18 and the shaft portion 6a to obviate wear on the end of the spring when the motorshaft rotates relative to the sleeve 13.

The operation is as follows: When the motor is energized, immediately the light weight clutch plate is moved away from the motor housing and is engaged with the armature. Simultaneously the armature is started, and because there is no load on the armature initially it will accelerate rapidly without the high electric current drain encountered in starting an ordinary electric motor under load. Sleeve 13 is quickly coupled with the armature and rotates at the same speed. As soon as power is cut off, however, the clutch plate moves into engagement with the stationary flange 19 on the motor housing and the load driven by the motor stops instantly, even though the armature may continue to spin or overrun for a few seconds. Therefore the momentum of the rapidly spinning and relatively heavy armature is declutched from the load just before the load is braked. Because of its small mass the clutch plate has a low momentum and it moves to the braking position almost instantly when braked. The invention thus permits starting and acceleration of the armature before the clutch engages to throw the load on the motorshaft, also deceleration and stoppage of the load without affecting the armature, which continues to spin until friction, etc. stops it. Since the clutch is actuated by stray lines of force, its clutching power will be proportional to the load carried by the motor. As the electric current from the source of electricity to the motor is increased with increase in load, the stray lines of force from the field will be greatly increased. In other words, the field which is designed for normal operating conditions "spills over" some of its energy in the form of stray lines of force of considerable strength, whenever the motor is overloaded.

In the Garrett Patent No. 665,318, dated January 1, 1901, it was proposed to employ a motor having a clutch plate fast to its shaft and another clutch plate loose on the shaft but fixed to a pinion which drives the load, the two clutch plates being separated by a coil spring but engageable by magnetism to couple the motor mechanically to its load. No braking effect is obtained in this construction, and the magnetic activation of the clutch is dependent on power taken from the power source which drives the motor. The Hutchins et al. Patent No. 2,195,654 discloses a small radio motor having a clutch located wholly within the motor casing and adapted to couple the motor to its load by magnetic action; however, both forms of the invention are inefficient because some of the armature laminations are removed in order to make room for the clutch. The embodiment of Figs. 3 and 4 is additionally undesirable due to the fact that the clutch is constantly slipping and hence wearing away when disengaged, and because a special armature and special motor housing are used. Neither form has any braking action. The Lear et al. Patent No. 2,267,114, December 23, 1941, discloses a small motor having a clutch comprising a fixed member secured to the motorshaft and a movable member magnetically clutched to the fixed member and driving a reduction gearing to which the load is connected. In this patent the movable clutch member is disengaged by springs when the magnetism fails and engages brake shoes fixed to the reduction gear housing. While this arrangement has some of the advantages of our invention, the clutch and the parts associated therewith are wholly outside of the motor housing. Furthermore, the power source which drives the motor is employed to energize the clutch-operating solenoid, which is undesirable for several reasons.

The present invention provides for the first time a combined magnetic clutch and brake wholly inside the motor housing and requiring very little modification of the motor and no loss of efficiency thereof, the entire magnetic force which operates the clutch being the stray field outside the normal operating field of the motor. While the device of the invention will not operate properly when there is an end thrust on the motorshaft or when the motor must be instantaneously reversed, for lightly loaded motors with spur gear or belt drives which are not reversed until they come to a full stop, the invention may be quite useful.

Obviously our invention may be embodied in various forms neither shown nor described.

Having described our invention, what we claim as new and desire to secure by Letters Patent is:

An electric motor which comprises a housing, a field fixed in said housing, axially aligned shaft bearings in said housing, a tubular shaft rotatable and axially movable in one of said bearings, a power take-off member fast on the outer end of said tubular shaft outside said housing and a clutch-and-brake disc fast on the inner end of said tubular shaft within said housing, an armature shaft having one end rotatable in one of said shaft bearings and the other end rotatable in said tubular shaft, an armature on said shaft between said bearings, said clutch-and-brake disc being spaced between the end of said armature and the inside face of said housing, and a spring within said tubular shaft having one end reacting against the end of said armature shaft urging it inward and the other end reacting against the tubular shaft urging it outward, thereby to yieldably hold said clutch and brake disc against the inside face of said housing when no current is passing through said motor, said disc being adapted to be drawn away from said housing and against said armature by stray magnetic lines emanating from said field and armature whenever an electric current is passing through said motor.

CHARLES L. PAULUS.
RAYMOND K. STOUT.